(12) United States Patent
Xu et al.

(10) Patent No.: US 7,692,892 B2
(45) Date of Patent: Apr. 6, 2010

(54) TWO-MATERIAL BASE FOR A DATA STORAGE SYSTEM

(75) Inventors: Mo Xu, Watsonville, CA (US); Niroot Jierapipatanakul, Singapore (SG); Wei Rhen Spencer Hoon, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 854 days.

(21) Appl. No.: 11/458,455

(22) Filed: Jul. 19, 2006

(65) Prior Publication Data

US 2008/0019038 A1 Jan. 24, 2008

(51) Int. Cl.
*G11B 33/14* (2006.01)
*H02K 7/00* (2006.01)
*H02K 11/00* (2006.01)

(52) U.S. Cl. .................. 360/99.08; 310/67 R
(58) Field of Classification Search ............. 310/67 R, 310/90; 360/97.01, 97.02, 98.07, 99.08, 360/99.04
See application file for complete search history.

(56) References Cited

U.S. PATENT DOCUMENTS

| | | | | | |
|---|---|---|---|---|---|
| 4,661,735 | A | * | 4/1987 | Miki et al. ................... | 310/112 |
| 4,814,914 | A | * | 3/1989 | Hagiwara et al. ......... | 360/98.08 |
| 4,998,033 | A | * | 3/1991 | Hisabe et al. ............. | 310/67 R |
| 5,038,240 | A | * | 8/1991 | Isomura .................... | 360/99.08 |
| 5,414,574 | A | * | 5/1995 | Boutaghou et al. ........ | 360/97.01 |
| 5,452,156 | A | * | 9/1995 | Uda et al. ................. | 360/97.01 |
| 5,479,304 | A | * | 12/1995 | Morita ..................... | 360/98.07 |
| 5,483,113 | A | * | 1/1996 | Sakuragi et al. ........... | 310/67 R |
| 5,519,270 | A | * | 5/1996 | Yamada et al. ............ | 310/67 R |
| 5,602,697 | A | * | 2/1997 | Jeong et al. .............. | 360/97.02 |
| 5,654,847 | A | | 8/1997 | Yagi et al. | |
| 5,774,302 | A | * | 6/1998 | Elsaesser et al. ......... | 360/98.07 |
| 5,821,453 | A | | 10/1998 | Epstein et al. | |
| 5,821,454 | A | | 10/1998 | Babb et al. | |
| 6,025,446 | A | * | 2/2000 | Kulkarni et al. .......... | 525/326.9 |
| 6,144,124 | A | * | 11/2000 | Nakagawa et al. ........ | 310/67 R |
| 6,510,021 | B1 | * | 1/2003 | Woldemar et al. ........ | 360/97.01 |
| 6,522,498 | B1 | * | 2/2003 | Lim et al. ................ | 360/97.02 |
| 6,740,991 | B2 | | 5/2004 | Takagi et al. | |
| 6,844,636 | B2 | * | 1/2005 | Lieu et al. ...................... | 310/43 |
| 7,122,922 | B2 | * | 10/2006 | Xu et al. ........................ | 310/51 |
| 7,321,178 | B2 | * | 1/2008 | Wakitani et al. ............ | 310/216 |
| 2002/0057024 | A1 | * | 5/2002 | Masuda ....................... | 310/90 |
| 2003/0071382 | A1 | | 4/2003 | Neal | |
| 2003/0081347 | A1 | | 5/2003 | Neal et al. | |
| 2004/0189113 | A1 | * | 9/2004 | Kuribara .................... | 310/67 R |
| 2004/0232782 | A1 | * | 11/2004 | Xu et al. .................... | 310/67 R |

(Continued)

FOREIGN PATENT DOCUMENTS

JP 05225686 A * 9/1993

(Continued)

*Primary Examiner*—William J Klimowicz
(74) *Attorney, Agent, or Firm*—Leanne Taveggia Farrell; Westman, Champlin & Kelly, P.A.

(57) ABSTRACT

An enclosure system includes a motor assembly that has a motor magnet and at least one motor coil. The enclosure system also includes a base coupled to the motor assembly. The base includes a first portion that includes a non-magnetic material and a second portion that includes a magnetic material. The first portion of the base is in closer proximity to the motor magnet than the second portion of the base.

7 Claims, 3 Drawing Sheets

U.S. PATENT DOCUMENTS

2006/0147133 A1* 7/2006 Saichi ..................... 384/100
2007/0013255 A1* 1/2007 Wakitani et al. ............ 310/216

FOREIGN PATENT DOCUMENTS

| JP | 07007883 A | * | 1/1995 |
| JP | 11176076 A | * | 7/1999 |
| JP | 2000285666 A | * | 10/2000 |
| JP | 2002125354 A | * | 4/2002 |
| JP | 2003263856 A | * | 9/2003 |
| JP | 2004111037 A | * | 4/2004 |
| JP | 2004248334 A | * | 9/2004 |

\* cited by examiner

TWO-MATERIAL BASE FOR A DATA STORAGE SYSTEM

FIELD OF THE INVENTION

The present invention relates generally to a base, and more particularly but not by limitation to a base coupled to a motor assembly.

BACKGROUND OF THE INVENTION

A typical data storage system includes a rigid housing having a base and top cover that encloses a variety of components. The components include one or more discs having data surfaces for storage of digital information. The disc(s) are mounted on a spindle motor. The spindle motor causes the disc(s) to spin and the data surfaces of the disc(s) to pass under respective aerodynamic bearing disc head sliders. The sliders carry transducers, which write information to and read information from the data surfaces of the discs.

Recently, there has been a rapid increase in the production of smaller and lighter weight disc drives in the disc drive industry as well as a rapid increase in the areal density of disc(s). These smaller sized disc drives are for use with handheld or portable devices, such as cell phones and digital music players, which are energized by a battery. When producing smaller sized disc drives for portable devices, it is often desirable to include a spindle motor with a high electromagnetic (EM) performance level. Spindle motors having high EM performance levels include low power consumption, a high torque constant ($K_t$) and a high voltage margin at low temperatures (to overcome start up problems).

In addition, it is desirable to include spindle motors that have small z-heights and fluid dynamic bearings (FDB). Small z-heights allow the disc drive to be as small as possible for use in portable devices. Fluid dynamic bearings in a spindle motor generate much less vibration in comparison to conventional ball bearings. However, spindle motors, having fluid dynamic bearings, consume much more power than that of spindle motors having conventional ball bearings. In general, the power consumption of fluid dynamic bearings can consume 1.5 to 2.0 times more power than conventional ball bearings. Although the use of fluid dynamic bearings in a spindle motor are desirable, the large power consumption of fluid dynamic bearings compromises EM performance levels in the spindle motor.

Embodiments of the present invention provide solutions to these and other problems, and offer other advantages over the prior art.

SUMMARY OF THE INVENTION

An enclosure system includes a motor assembly that has a motor magnet and at least one motor coil. The enclosure system also includes a base coupled to the motor assembly. The base includes a first portion that includes a non-magnetic material and a second portion that includes a magnetic material. The first portion of the base is in closer proximity to the motor magnet than the second portion of the base.

The base includes an inner surface and an outer surface. The inner surface includes a first section that includes the first portion of the base. The inner surface also includes a second section that includes the second portion of the base. The motor magnet includes a dimension that faces the inner surface of the base. The first section of the inner surface corresponds with at least the dimension of the motor magnet that faces the inner surface.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
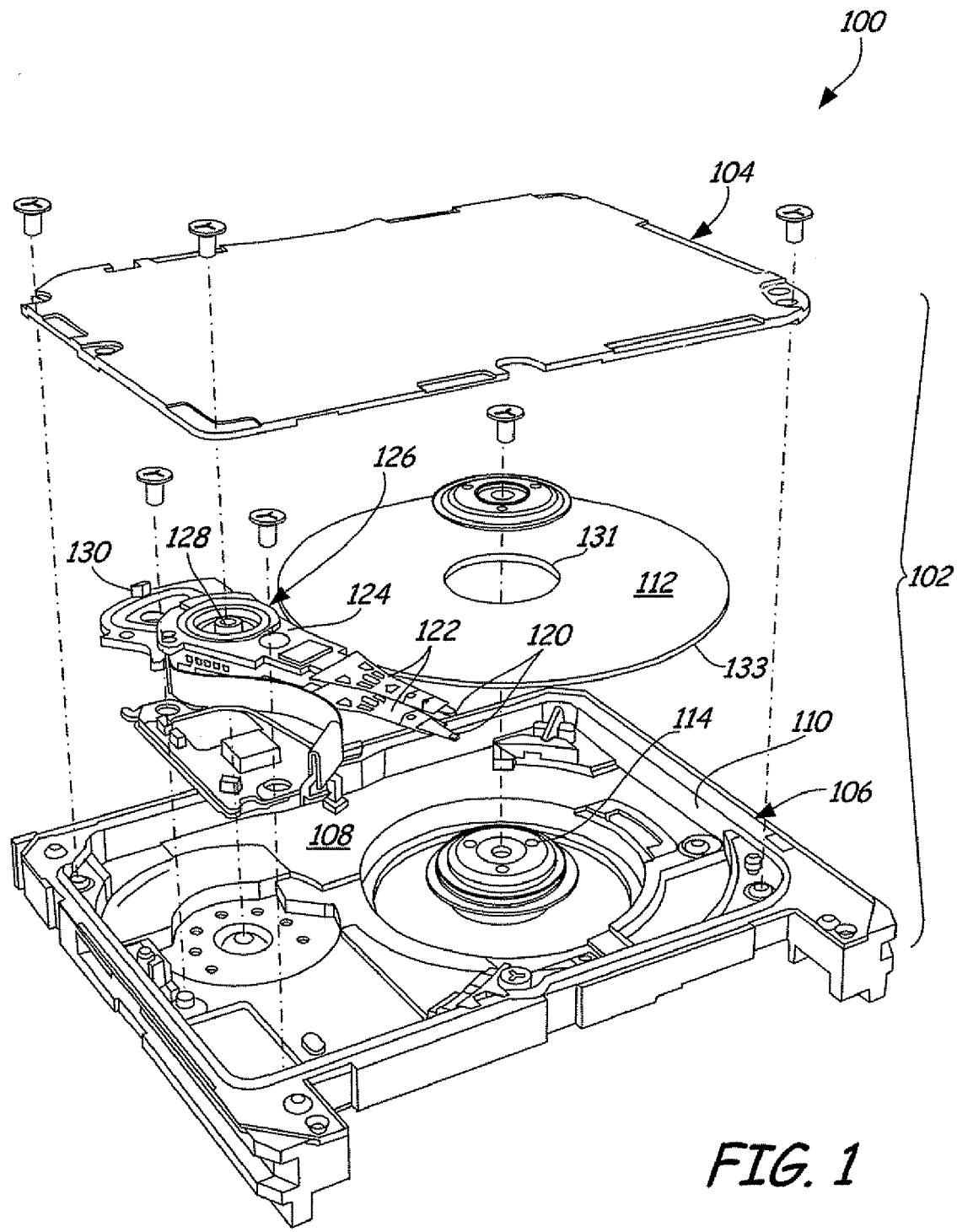
FIG. 1 is an exploded perspective view of a disc drive.

FIG. 1 is an exploded perspective view of a disc drive 100 in which embodiments of the present invention are useful. Disc drives are common data storage systems. One or more embodiments of the present invention are also useful in other types of data storage and non-data storage systems.

Disc drive 100 includes a housing 102 having a cover 104 and a base 106. As shown, cover 104 attaches to base 106 to form an enclosure 108 enclosed by a perimeter wall 110 of base 106. The components of disc drive 100 are assembled to base 106 and are enclosed in enclosure 108 of housing 102. As shown, disc drive 100 includes a disc or medium 112. Although FIG. 1 illustrates medium 112 as a single disc, those skilled in the art should understand that more than one disc can be used in disc drive 100. Medium 112 stores information in a plurality of circular, concentric data tracks and is mounted on a spindle motor assembly 114. Spindle motor assembly 114 rotates medium 112 causing its data surfaces to pass under respective hydrodynamic bearing slider surfaces. Each surface of medium 112 has an associated slider 120, which carries transducers that communicate with the surface of the medium. The slider and transducers are often together referred to as a read/write head. In smaller sized disc drives, often perpendicular recording technologies are utilized.

In the example shown in FIG. 1, sliders 120 are supported by suspension assemblies 122, which are, in turn, attached to track accessing arms 124 of an actuator mechanism 126. Actuator mechanism 126 is rotated about a shaft 128 by a voice coil motor 130. Voice coil motor 130 rotates actuator mechanism 126 to position sliders 120 relative to desired data tracks, between a disc inner diameter 131 and a disc outer diameter 133.

In general, there are two types of bases that can be used to produce smaller sized disc drives. One type of base is an aluminum base casting, while another type of base is a stamped steel base. Both types of bases utilize machining technologies. In either type of base, spindle motor assembly 114 is integrated into base 106. Often, a stamped steel base is the type of base chosen for producing smaller sized disc drives. A stamped steel base has a high stiffness and can be made of a soft magnetic material to protect a read/write head, especially perpendicular recording read/write heads, from external magnetic fields. An aluminum base casting does not demonstrate these desirable traits. An aluminum base casting does not provide sufficient magnetic shielding, it has a low stiffness and more drive parts which takes more space and results in higher drive part cost.

Figure 2:
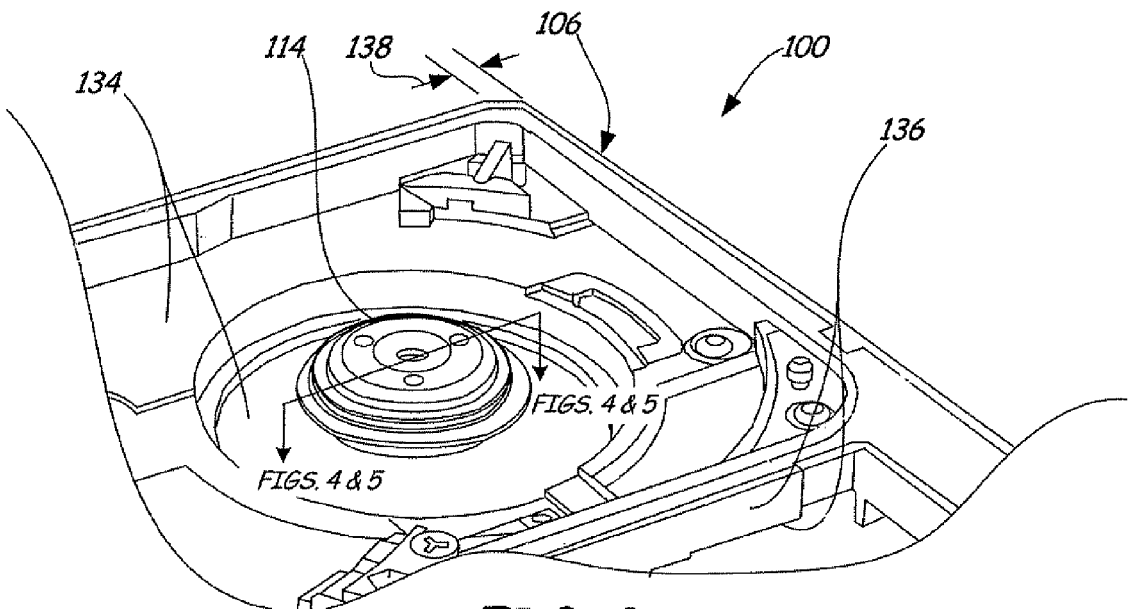
FIG. 2 illustrates an enlarged perspective view of the spindle motor assembly mounted to the base of the disc drive illustrated in FIG. 1.

FIG. 2 illustrates an enlarged partial perspective view of spindle motor assembly 114 mounted to base 106 of disc drive 100 illustrated in FIG. 1. Base 106 includes an inner surface 134, an outer surface 136 and a thickness 138. Thickness 138 extends between inner surface 134 and outer surface 136 of base 106. FIG. 2 also indicates the location of the sectional views illustrated in FIGS. 4 and 5.

Figure 3:
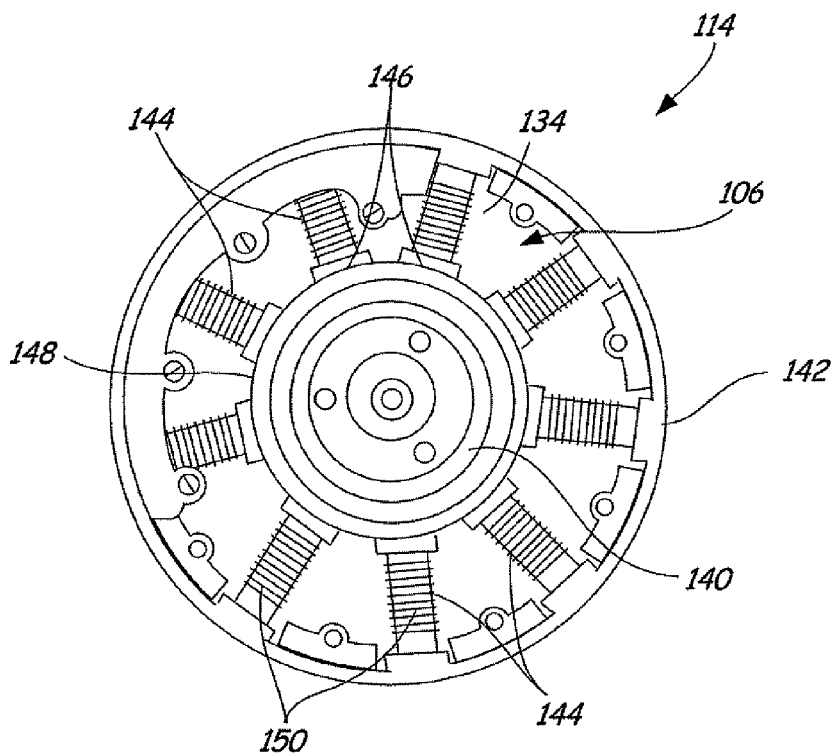
FIG. 3 illustrates a top plan view of a spindle motor assembly with a motor shield removed for purposes of clarity.

FIG. 3 illustrates an enlarged top plan view of spindle motor assembly 114 illustrated in FIGS. 1 and 2. For purposes of clarity, a motor shield of spindle motor assembly 114 has been removed to show its relevant components and illustrate inner surface 134 of base 106. Spindle motor assembly 114 includes a centrally located hub or rotor 140. A stator rim 142 is spaced apart from and positioned around rotor 140. A plurality of stator teeth 144 are symmetrically spaced apart from each other and radially extend inwardly from stator rim 142 to hub 140. Stator teeth 144 include a stator teeth inner diameter 146. An annular motor magnet 148 is positioned about hub 140 and is spaced apart from stator teeth inner diameter 146. Spindle motor assembly 114 also includes at least one motor coil 150 that is wound around and supported by each stator tooth 144. In operation, at least one motor coil 150 and stator teeth 144 generate a magnetic flux that interacts with annular motor magnet 148 to thereby operably rotate hub 140.

Even if base 106 is made of the more desirable stamped steel base and also a soft magnetic material, spindle motor assembly 114 can still experience an undesirably low electromagnetic (EM) performance. For example, spindle motor assembly 114 can experience a high bearing friction that results in a high power consumption, a low torque constant ($K_t$) as well as a start up problem at low temperatures. The cause of the low EM performance is that the space between soft magnetic base 106 and motor magnet 148 is too small. Magnetic flux will not only travel through stator teeth 144 but will also have a high attraction force between motor magnet 148 and soft magnetic base 106. This results in a much higher bearing friction and, hence, a much higher power consumption and a much lower torque constant ($K_t$) of the spindle motor.

To increase the space between soft magnetic base 106 and motor magnet 148, either motor magnet 148 can become thinner or a z-height of spindle motor assembly 114 can be increased. As previously discussed, when producing smaller sized disc drives, a small z-height of spindle motor assembly 114 should not be sacrificed. In the alternative, thinning motor magnet 148 is also detrimental. A thin motor magnet will result in low EM performance. For example, spindle motor assembly 114 would suffer from high power consumption, a low $K_t$ and a low voltage margin under low temperatures (i.e. a start up problem).

Figure 4:
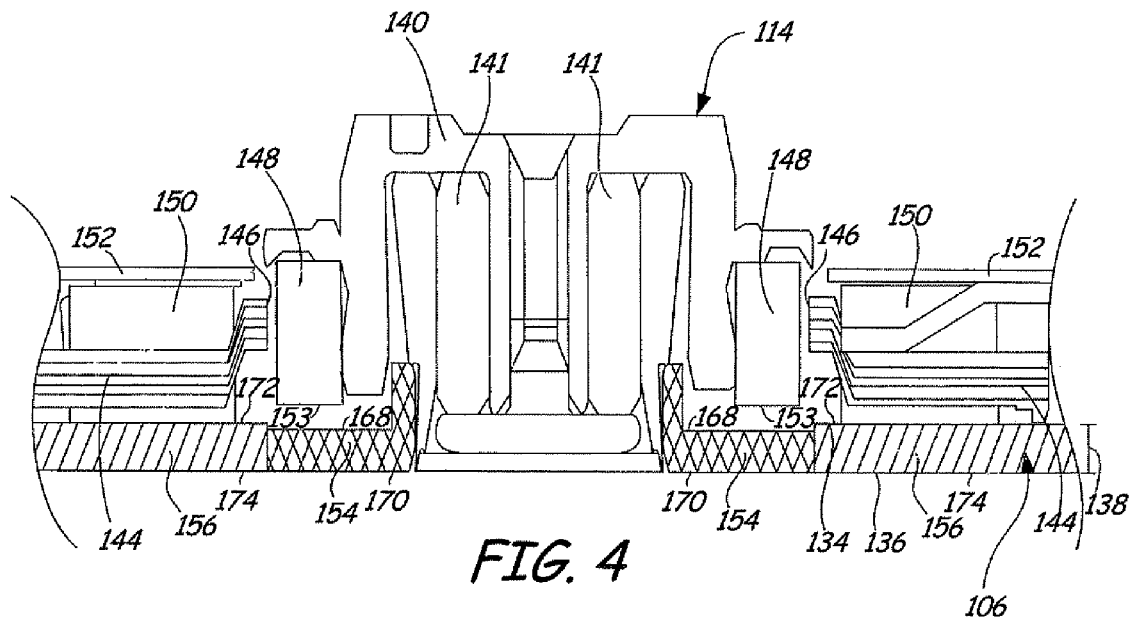
FIG. 4 illustrates a sectional view of a spindle motor assembly and base.

Instead of increasing the space between soft magnetic base 106 and motor magnet 148 by thinning motor magnet 148 or increasing the z-height of spindle motor assembly 114, embodiments of the present invention utilize a two material system for the base plate to solve EM performance problems. One of the materials is a non-magnetic material and the other one of the materials is a magnetic material. In accordance with one embodiment, FIG. 4 illustrates a sectional view of spindle motor assembly 114 mounted to base 106, both of which were illustrated in FIGS. 1, 2 and 3. Base 106 includes inner surface 134 and outer surface 136. Spindle motor assembly 114 includes centrally located rotor or hub 140. Hub 140 includes fluid dynamic bearing (FDB) unit 141. FDB unit 141 includes two hydrodynamic journal bearings and two hydrodynamic thrust bearings. The hydrodynamic journal and thrust bearings are formed between a shaft and a thrust plate and a sleeve filled with lubricant. FDB unit 141 provides a decrease in vibration and shock compared to conventional ball bearings as well as robustness and adequate rotational speed.

Stator teeth 144 extend from stator rim (not illustrated in FIG. 4) inwardly towards hub 140. Stator teeth 144 include stator teeth inner diameter 146. Motor magnet 148 is positioned about hub 140 and is spaced apart from stator teeth inner diameter 146. Spindle motor assembly 114 also includes at least one motor coil 150 that is wound around and supported by each stator tooth 144. Motor shield 152 protects the rotating discs from the at least one motor coil 150.

In the embodiment illustrated in FIG. 4, motor magnet 148 includes a dimension 153 that faces inner surface 134 of base 106 and is positioned closely to inner surface 134 of base 106. In particular, the space between motor magnet 148 and inner surface 134 of base 106 is approximately 0.1 mm. To ensure spindle motor assembly 114 has a high EM performance, base 106 includes a first portion 154 comprising a non-magnetic material and a second portion 156 comprising a magnetic material. Second portion 156 is made of a soft magnetic material, such as cold rolled steel. First portion 154 is made of a non-magnetic material, such as 300-series stainless steel. First portion 154 and second portion 156 are metal injection molded (MIM) together to form base 106. The two-material metal injection molding process can be easily achieved by molding features of base 106 in second portion 156 and then molding features of base 106 in first portion 154. First portion 154 and second portion 156 are sintered together at the same temperature range to form a single, solid piece. Therefore, the soft magnetic material of second portion 156 and the non-magnetic material of first portion 154 have similar sintering temperature ranges such that they can "melt and bond" with each other at their interfaces. The final base 106 is a single solid piece that consists of two materials.

In FIG. 4, first portion 154 is in closer proximity to motor magnet 148 than second portion 156. Since first portion 154 is a non-magnetic material, the magnetic attraction force between the base 106 and motor magnet 148 is greatly reduced compared to a conventional single magnetic material base. In the embodiment illustrated in FIG. 4, a first section 168 of inner surface 134 includes first portion 154. First portion 154 extends a thickness 138 of base 106 from inner surface 134 to outer surface 136. A first section 170 of outer surface 136 also includes first portion 154. In one embodiment, first portion 154 corresponds with at least dimension 153 of motor magnet 148. In another embodiment and as illustrated in FIG. 4, first portion 154 corresponds with at least inner diameter 146 of stator teeth 144. When the non-magnetic material of first portion 154 corresponds with at least the inner diameter 146 of stator teeth 144, the chance that magnetic flux travels from stator teeth 144 to base 106 that is below motor magnet 148 is greatly reduced. In the embodiment illustrated in FIG. 4, a second section 172 of inner surface 134 includes the soft magnetic material of second portion 156. Second portion 156 extends a thickness 138 of base 106 from inner surface 134 to outer surface 136. A second section 174 of outer surface 136 also includes second portion 156.

In the embodiment illustrated in FIG. 4, the non-magnetic material of first portion 154 is located under the motor magnet to significantly improve EM performance levels. In such a configuration, spindle motor assembly 114 will consume significantly less power, the $K_t$ will be higher and the voltage margin will be much better under low temperatures. The position of the non-magnetic material of first portion 154 prevents magnetic flux from traveling through stator teeth 144 and also eliminates otherwise high attraction forces between motor magnet 148 and base 106. A single soft magnetic material base would have significant attraction forces between the motor magnet and the base as previously discussed.

Figure 5:
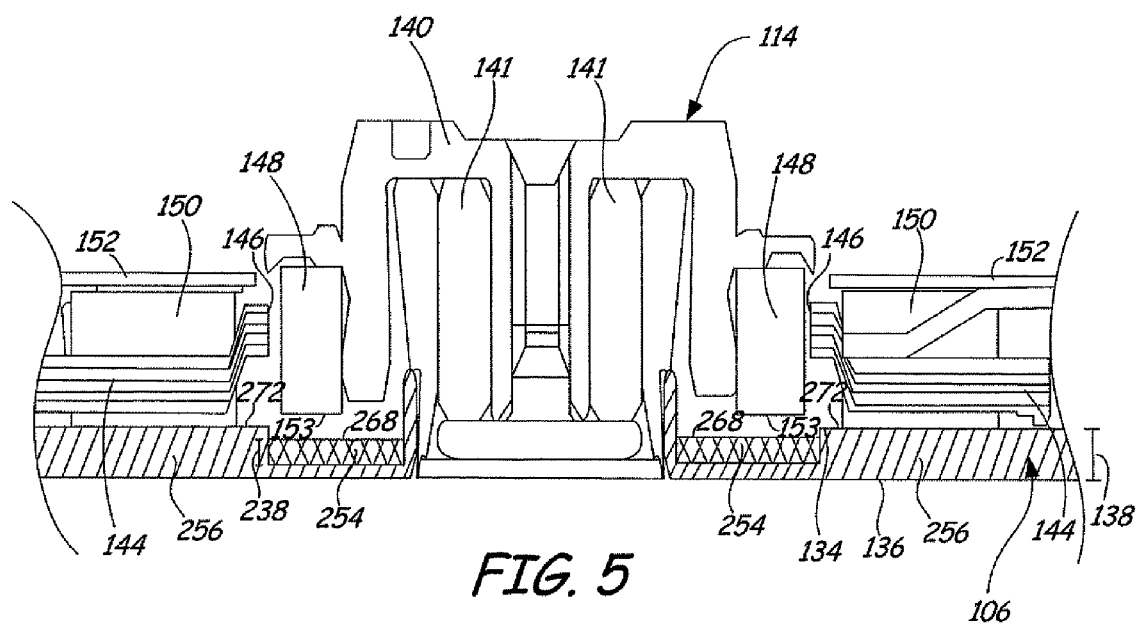
FIG. 5 illustrates a sectional view of a spindle motor assembly and base.

In accordance with another embodiment, FIG. 5 illustrates a sectional view of spindle motor assembly 114 mounted to base 106, both of which were illustrated in FIGS. 1, 2, 3 and 4. Base 106 includes inner surface 134 and outer surface 136. Spindle motor assembly 114 includes centrally located rotor or hub 140. Hub 140 includes fluid dynamic bearing (FDB) unit 141.

Stator teeth 144 extend from stator rim (not illustrated in FIG. 5) inwardly towards hub 140. Stator teeth 144 include stator teeth inner diameter 146. Motor magnet 148 is positioned about hub 140 and is spaced apart from stator teeth inner diameter 146. Spindle motor assembly 114 also includes at least one motor coil 150 that is wound around and supported by each stator tooth 144. Motor shield 152 protects the rotating discs from the at least one motor coil 150.

In the embodiment illustrated in FIG. 5, motor magnet 148 includes a dimension 153 that faces inner surface 134 of base 106. Dimension 153 is positioned closely to inner surface 134 of base 106. In particular, the space between motor magnet 148 and inner surface 134 of base 106 is approximately 0.1 mm. To ensure spindle motor assembly 114 has a high EM performance, base 106 includes a first portion 254 comprising a non-magnetic material and a second portion 256 comprising a magnetic material. Second portion 256 is made of a soft magnetic material, such as cold rolled steel. First portion 254 is made of a non-magnetic material, such as 300-series stainless steel. First portion 254 and second portion 256 are metal injection molded (MIM) together to form base 106. The two-material metal injection molding process is described above in accordance with FIG. 4.

In FIG. 5, first portion 254 is in closer proximity to motor magnet 148 than second portion 256. Since first portion 254 is a non-magnetic material, the magnetic attraction force between the base 106 and motor magnet 148 is greatly reduced compared to a conventional single magnetic material base. In the embodiment illustrated in FIG. 5, a first section 268 of inner surface 134 includes first portion 254. First portion 254 extends a partial thickness 238 of base 106 from inner surface 134 towards outer surface 136. In one embodiment, first portion 254 corresponds with at least dimension 153 of motor magnet 148. In another embodiment and as illustrated in FIG. 5, first portion 254 corresponds with at least inner diameter 146 of stator teeth 144. When the non-magnetic material of first portion 254 corresponds with at least the inner diameter 146 of stator teeth 144, the chance that magnetic flux travels from stator teeth 144 to base 106 that is below motor magnet 148 is greatly reduced. In the embodiment illustrated in FIG. 5, a second section 272 of inner surface 134 includes the soft magnetic material of second portion 256. Second portion 256 extends a thickness 138 of base 106 from inner surface 134 to outer surface 136. Second portion 256 of base 106 is also included in outer surface 136 and underlies first portion 254.

In the embodiment illustrated in FIG. 5, the non-magnetic material of first portion 254 lies just below and is spaced apart from the dimension 153 of motor magnet 148. First portion 254 also lies above second portion 256. In this embodiment, EM performance levels are improved. The position of the non-magnetic material of first portion 254 prevents magnetic flux from traveling through stator teeth 144 and also eliminates otherwise high attraction forces between motor magnet 148 and base 106. A single soft magnetic material base would have significant attraction forces between the motor magnet and the base as previously discussed. Also, since second portion 256 lies below first portion 254, base 106 will provide magnetic shielding effect in all areas, including the area under motor magnet 148.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the enclosure system while maintaining substantially the same functionality without departing from the scope and spirit of the present invention. In addition, although the preferred embodiment described herein is directed to a base for data storage system, it will be appreciated by those skilled in the art that the teachings of the present invention can be applied to other types of enclosure systems, without departing from the scope and spirit of the present invention.

What is claimed is:

1. An enclosure system comprising:
   a motor assembly having a motor magnet and at least one motor coil, the motor magnet including a first dimension;
   a base having an inner surface that faces the first dimension of the motor magnet, an outer surface and a thickness defined between the inner surface and the outer surface, the base coupled to the motor assembly and comprising:
      a first portion comprising a non-magnetic material, wherein the first portion is defined by at least a portion of the base that corresponds with the first dimension of the motor magnet and extends from the inner surface of the base towards the outer surface of the base by a distance that is less than the thickness of the base;
      a second portion comprising a magnetic material defined by a remaining portion of the base, the first portion being in closer proximity to the motor magnet than the second portion.

2. The enclosure system of claim 1, wherein the magnetic material of the second portion comprises a soft magnetic material.

3. The enclosure system of claim 1, wherein the motor assembly and the base are included in a data storage system.

4. The enclosure system of claim 1, wherein the motor assembly further comprises a motor stator that supports the at least one motor coil and includes an inner diameter that is spaced apart from and surrounds the motor magnet.

5. The enclosure system of claim 4, wherein the first portion of the base is further defined by at least a portion of the base that corresponds with at least the inner diameter of the motor stator.

6. The enclosure system of claim 1, wherein the first portion comprises a non-magnetic 300 series steel.

7. The enclosure system of claim 6, wherein the second portion comprises a magnetic cold rolled steel.

* * * * *